(12) United States Patent
Shin et al.

(10) Patent No.: US 11,850,932 B2
(45) Date of Patent: Dec. 26, 2023

(54) STRUCTURE FOR FASTENING BATTERY TO VEHICLE

(71) Applicants: Hyundai Motor Company, Seoul (KR); KIA CORPORATION, Seoul (KR)

(72) Inventors: Gyung Hoon Shin, Seoul (KR); Yong Hwan Choi, Seoul (KR); Yu Ri Oh, Gyeonggi-do (KR); Tae Hyuck Kim, Chungcheongnam-do (KR); Hae Kyu Lim, Bucheon-si (KR); Ji Woong Jung, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 175 days.

(21) Appl. No.: 17/382,805

(22) Filed: Jul. 22, 2021

(65) Prior Publication Data
US 2022/0144060 A1 May 12, 2022

(30) Foreign Application Priority Data

Nov. 10, 2020 (KR) .................. 10-2020-0149450

(51) Int. Cl.
*B60K 1/02* (2006.01)
*B60K 1/04* (2019.01)
(Continued)

(52) U.S. Cl.
CPC ............... *B60K 1/04* (2013.01); *B60L 50/66* (2019.02); *H01M 50/249* (2021.01);
(Continued)

(58) Field of Classification Search
CPC ... B60K 1/04; B60K 2001/0438; B60L 50/66; B60L 50/64; H01M 50/249; H01M 50/242; H01M 2220/20
See application file for complete search history.

(56) References Cited

U.S. PATENT DOCUMENTS 10,483,510 B2    11/2019  Stephens et al.
11,088,412 B2 *   8/2021  Matecki ............ B60L 50/66
(Continued)

FOREIGN PATENT DOCUMENTS

CN         109103383 A    12/2018
JP         2012-126152 A   7/2012
(Continued)

OTHER PUBLICATIONS

U.S Office Action dated Sep. 16, 2022, issued in corresponding U.S. Appl. No. 17/153,053.
(Continued)

*Primary Examiner* — Jason D Shanske
*Assistant Examiner* — James J Triggs
(74) *Attorney, Agent, or Firm* — Morgan, Lewis & Bockius LLP

(57) ABSTRACT

A structure for fastening a battery to a vehicle includes: a carrier part including a pair of first members that is disposed at a lower portion of the vehicle in a longitudinal direction of the vehicle and bonded to both sides of a vehicle body, respectively, and a plurality of second members the pair of first members in contact with the pair of first members; and a battery having a case that houses a plurality of battery cells, in which a part of the case is connected to the first member, and the other part of the case is connected to the second member.

9 Claims, 11 Drawing Sheets

(51) Int. Cl.
  *B60L 50/60*      (2019.01)
  *H01M 50/249*   (2021.01)
  *H01M 50/242*   (2021.01)

(52) U.S. Cl.
  CPC ... *B60K 2001/0438* (2013.01); *H01M 50/242* (2021.01); *H01M 2220/20* (2013.01)

(56)       References Cited

U.S. PATENT DOCUMENTS

| | | |
|---|---|---|
| 2014/0246259 A1 | 9/2014 | Yamamura et al. |
| 2018/0022387 A1* | 1/2018 | Ta ............................ B60L 50/66 180/291 |
| 2018/0229593 A1 | 8/2018 | Hitz et al. |
| 2020/0057459 A1 | 2/2020 | Miyoshi et al. |

FOREIGN PATENT DOCUMENTS

| | | |
|---|---|---|
| JP | 2013-105615 A | 5/2013 |
| JP | 2017-193289 A | 10/2017 |
| JP | 2019-006303 A | 1/2019 |
| JP | 2019-018821 A | 2/2019 |
| KR | 10-2020-0033774 A | 3/2020 |
| KR | 10-2329209 B1 | 11/2021 |

OTHER PUBLICATIONS

U.S. Office Action dated Jan. 3, 2023, issued in corresponding U.S. Appl. No. 17/153,053.
U.S. Office Action dated Sep. 11, 2023, issued in corresponding U.S. Appl. No. 17/153,053.

* cited by examiner

CROSS SECTION AA

STRUCTURE FOR FASTENING BATTERY TO VEHICLE

CROSS REFERENCE TO RELATED APPLICATION

The present application claims the benefit of priority to Korean Patent Application No. 10-2020-0149450, filed Nov. 10, 2020 in the Korean Intellectual Property Office, the entire contents of which is incorporated herein for all purposes by this reference.

TECHNICAL FIELD

The present disclosure relates to a structure for fastening a battery to a vehicle, and more particularly, to a structure for fastening a battery to a vehicle that can be more robust and secure.

BACKGROUND

In recent years, interest in environmental vehicles is increasing due to environmental problems, high oil prices, and the like, and driving modules using electrical energy have been developed in various ways.

For example, in the automobile field, a battery powered electric vehicle (EV), a fuel cell EV using a fuel cell as an electric motor, a hybrid EV using an electric motor and an engine together, and the like are developed.

In particular, in the case of an electric vehicle, a large battery for storing electrical energy is provided. A battery applied to the electric vehicle may be configured to include a plurality of battery modules in which a plurality of battery cells are stacked and end plates and covers are disposed around the stacked battery cells, and a case that houses the battery modules. In addition, the battery of the electric vehicle may be mainly disposed under a floor of the vehicle and may be fastened to a part of a vehicle body.

As described above, since the conventional electric vehicle has a structure in which the battery is directly fastened to a lower portion of the vehicle body, it is difficult to fasten the battery to the conventionally developed vehicle body. Therefore, a new design of a dedicated body for an electric vehicle for fastening a battery is required. Accordingly, it is difficult to add a new lineup for an electric vehicle to the conventionally developed internal combustion engine vehicle, and problems such as an increase in manufacturing cost due to a new body design for installing a battery when changing to an electric vehicle may occur.

The contents described as the related art have been provided only for assisting in the understanding for the background of the present disclosure and should not be considered as corresponding to the related art known to those skilled in the art.

SUMMARY

An object of the present disclosure is to provide a structure for fastening a battery capable of mounting the battery on a vehicle body other than a dedicated body for an electric vehicle.

According to an exemplary embodiment of the present disclosure, a structure for fastening a battery to a vehicle includes: a carrier part including a pair of first members that is disposed at a lower portion of the vehicle in a longitudinal direction, the pair of first members connected to both sides of a vehicle body, respectively, and a plurality of second members that have both ends connected to the pair of first members; and a battery having a case that houses a plurality of battery cells, in which a part of the case is connected to the first member, and the other part of the case is connected to the second member.

The case may include a lower panel, a side wall member that is formed along a rim of the lower panel, and a case inner member that is disposed in a space, which is formed by the side wall member, in a longitudinal direction or a lateral direction of the vehicle, and the case may be fastened to the first member through the case inner member.

The case inner member may include a lateral member that extends in the lateral direction of the vehicle, and the case may be fastened to the first member through the lateral member The case inner member may include a lateral member that extends in the lateral direction of the vehicle and a reinforcing member that connects between the lateral member and the side wall member, and the case may be fastened to the first member through the reinforcing member.

The case may include a lower panel, a side wall member that is formed along a rim of the lower panel, and a wing part that extends outward in a lateral direction of the case from the side wall member, and in the case, the wing part may be fastened to the second member.

The battery may further include a fastening member having a structure that extends upward from an outside of the case, and a part of the battery may be directly bonded to the vehicle body by the fastening member.

According to another exemplary embodiment of the present disclosure, a structure for fastening a battery to a lower portion of a vehicle includes: a carrier part including a pair of first members that is disposed at the lower portion and bonded to both sides of a body of the vehicle, respectively, in a longitudinal direction and a plurality of second members that have both ends bonded to the pair of first members; and a case including a lower panel, a side wall member that is formed along a rim of the lower panel, a lateral member that extends in a space, which is formed by the side wall member, in the lateral direction of the vehicle, and a wing part that extends outward in the lateral direction of the case from the side wall member, in which the lateral member is fastened to the first member and the wing part is fastened to the second member to fasten the case to the vehicle.

The case may further include a reinforcing member that connects between the lateral member and the side wall member, and the case may be fastened to the first member through the reinforcing member.

The battery may further include a fastening member having a structure that extends upward from an outside of the case, and a part of the battery may be directly bonded to the vehicle body by the fastening member.

According to still another exemplary embodiment of the present disclosure, a structure for fastening a battery to a lower portion of a vehicle includes: a carrier part including a pair of first members that is disposed at the lower portion and bonded to both sides of a body of the vehicle, respectively, in a longitudinal direction and a plurality of second members that have both ends bonded to the pair of first members; and a case including a lower panel, a side wall member that is formed along a rim of the lower panel, a lateral member that extends in a space, which is formed by the side wall member, in the lateral direction of the vehicle, a reinforcing member that connects between the lateral member and the side wall member, and a wing part that extends outward in the lateral direction of the case from the side wall member, in which the reinforcing member is fastened to the first member and the wing part is fastened to the second member to fasten the case to the vehicle.

The case may be fastened to the first member through the lateral member.

The battery may further include a fastening member having a structure that extends upward from an outside of the case, and a part of the battery may be directly bonded to the vehicle body by the fastening member.

DETAILED DESCRIPTION OF THE EMBODIMENTS

Hereinafter, a structure for fastening a battery to a vehicle according to various embodiments of the present disclosure will be described in detail with reference to the accompanying drawings.

Figure 1:
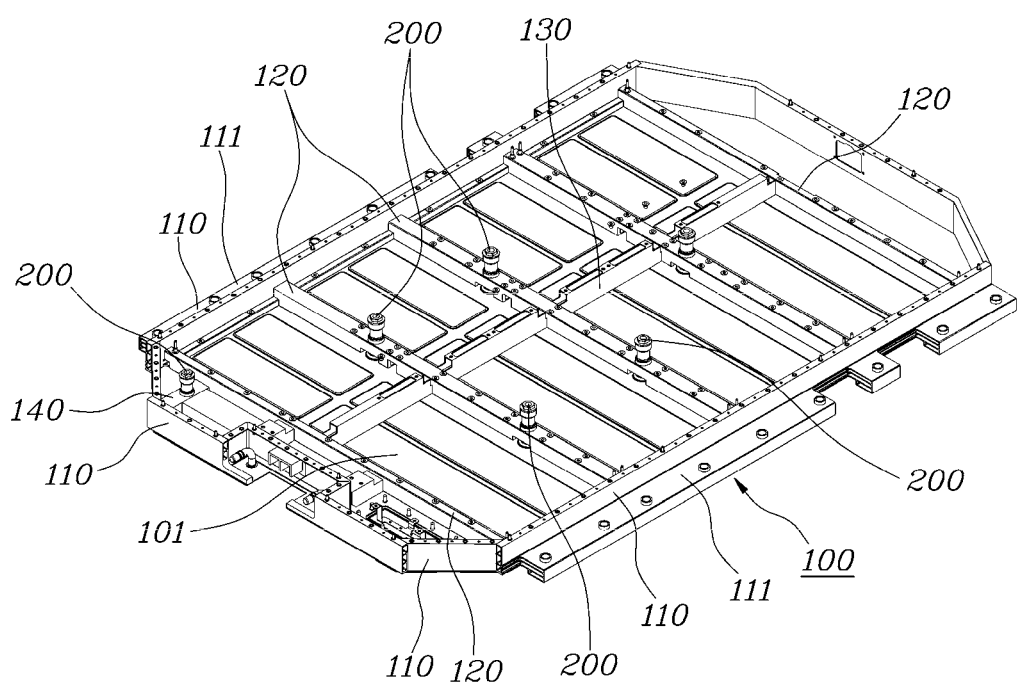
FIG. 1 is a perspective view illustrating a battery case structure to which a structure for fastening a battery according to an embodiment of the present disclosure is applied.
Figure 2:
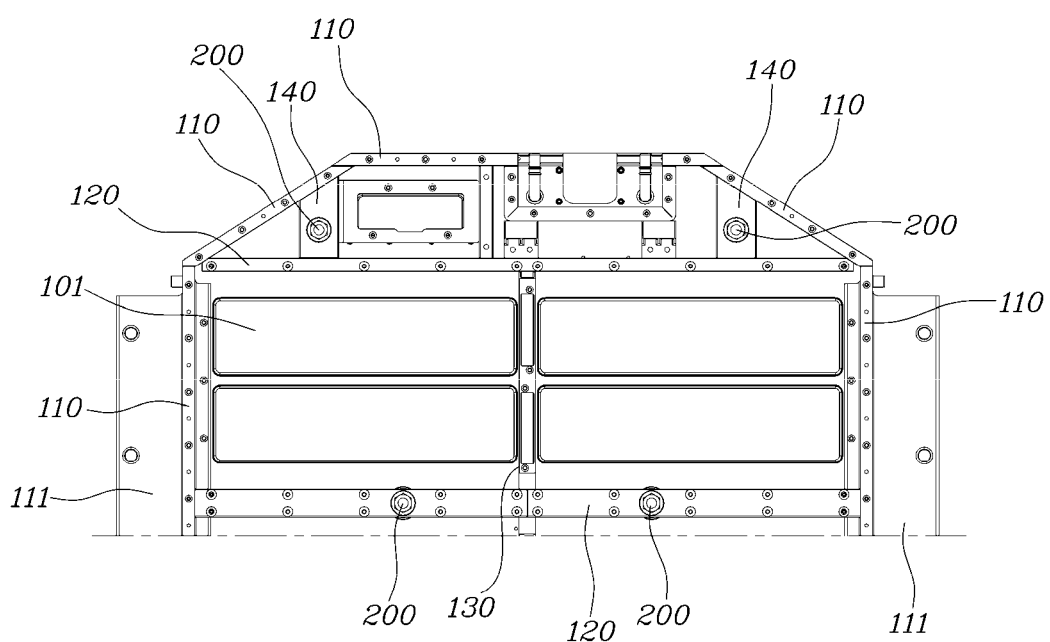
FIG. 2 is a plan view illustrating in more detail a part of the battery case structure illustrated in FIG. 1.
Figure 3:
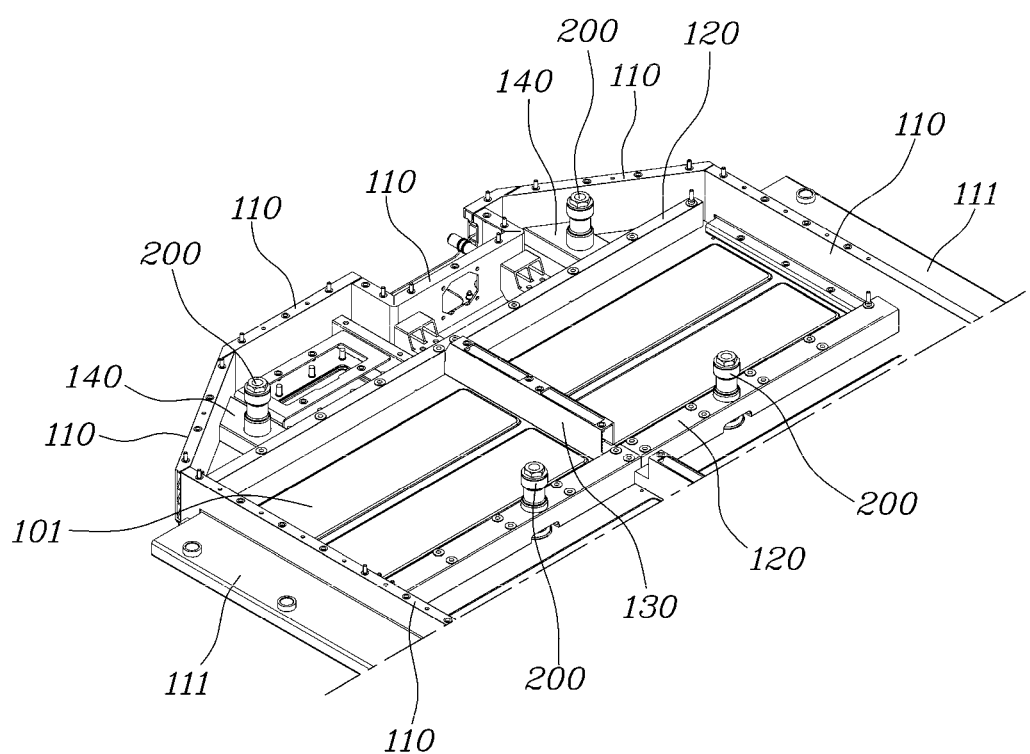
FIG. 3 is a perspective view illustrating a part of the battery case structure illustrated in FIG. 2.

FIG. 1 is a perspective view illustrating a battery case structure to which a structure for fastening a battery according to an embodiment of the present disclosure is applied, FIG. 2 is a plan view illustrating in more detail a part of the battery case structure illustrated in FIG. 1, and FIG. 3 is a perspective view illustrating a part of the battery case structure illustrated in FIG. 2.

Referring to FIGS. 1 to 3, a case 100 of a battery applied to a structure for fastening a battery to a vehicle according to an embodiment of the present disclosure may include a lower panel 101, a side wall member 110 formed along a rim of the lower panel, and case inner members 120, 130, and 140 arranged in a longitudinal direction or a lateral direction of a vehicle in a space formed by the side wall member 110.

A battery module, which is an assembly including a plurality of battery cells, or a plurality of battery cells may be disposed on an upper surface of the lower panel 101. A cooling channel for cooling the battery cells may be formed under the upper surface of the lower panel 101 to easily discharge heat generated during charging and discharging of the battery cells. The structure in which the battery cell or the battery module is disposed is not directly related to the technical idea of the present disclosure, and therefore, will not be illustrated in detail.

The side wall member 110 may be a side wall member that is disposed along the rim of the lower panel 101 to form a space for disposing the battery cell or the battery module on the lower panel 101.

The side wall member 110 may be formed with a wing part 111 that extends in parallel with the lower panel 101 in an external direction of the battery case 100. A fastening hole is formed in the wing part 111 to fasten between the battery case 100 and the vehicle by the fastening member.

The case inner members 120, 130, and 140 are disposed between the side wall members 110 facing each other or between the side wall members 110 and the case inner members 120, 130, and 140 to divide an upper space of the lower panel 101 formed by the side wall members 110. The battery cell or the battery module may be disposed in the space divided by the case inner members 120, 130, and 140. In addition, circuit elements, connectors, and the like necessary for battery management may be disposed in a part (for example, spaces formed at front and rear ends of the case) of the space divided by the case inner members 120, 130, and 140.

Specifically, the case inner members 120, 130, and 140 may include a plurality of lateral members 120 that extend in the lateral direction (horizontal direction) of the vehicle, a longitudinal member 130 that is disposed between the plurality of lateral members 120 in a front-rear direction (longitudinal direction) of the vehicle, and a reinforcing member 140 that is disposed between the lateral member 120 and the side wall member 110.

The lateral member 120, the longitudinal member 130, and the reinforcing member 140 may form a load path to be used for securing rigidity against an impact applied in the front-rear direction or the lateral direction of the case.

The structure for fastening a battery according to the embodiment of the present disclosure may fasten between the battery and the vehicle through at least some of the case inner members 120, 130 and 140 as described above. In the example of FIGS. 1 to 3, the fastening member used for fastening may be partially disposed in the lateral member 120 and the reinforcing member 140 so that the battery may be fastened to the vehicle through the lateral member 120 and the reinforcing member 140 of the case 100.

The fastening member illustrated in FIGS. 1 to 3 is a metal bush, and fastening holes may be formed in areas under positions where the metal bushes 200 of the lateral member 120, the reinforcing member 140, and the lower panel 101 are disposed so that other fastening members may penetrate through the metal bush 200.

Figure 4:
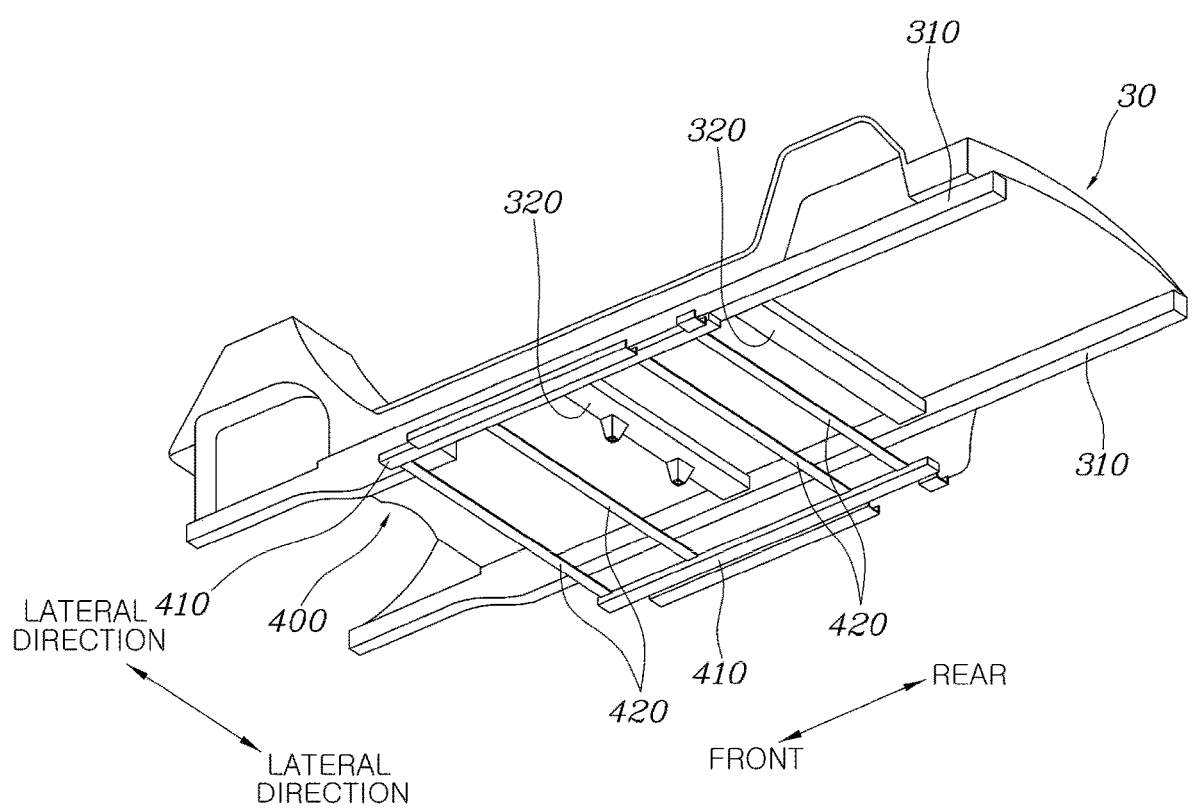
FIG. 4 is a perspective view illustrating a lower portion of a vehicle body to which the structure for fastening a battery according to an embodiment of the present disclosure is applied.
Figure 5:
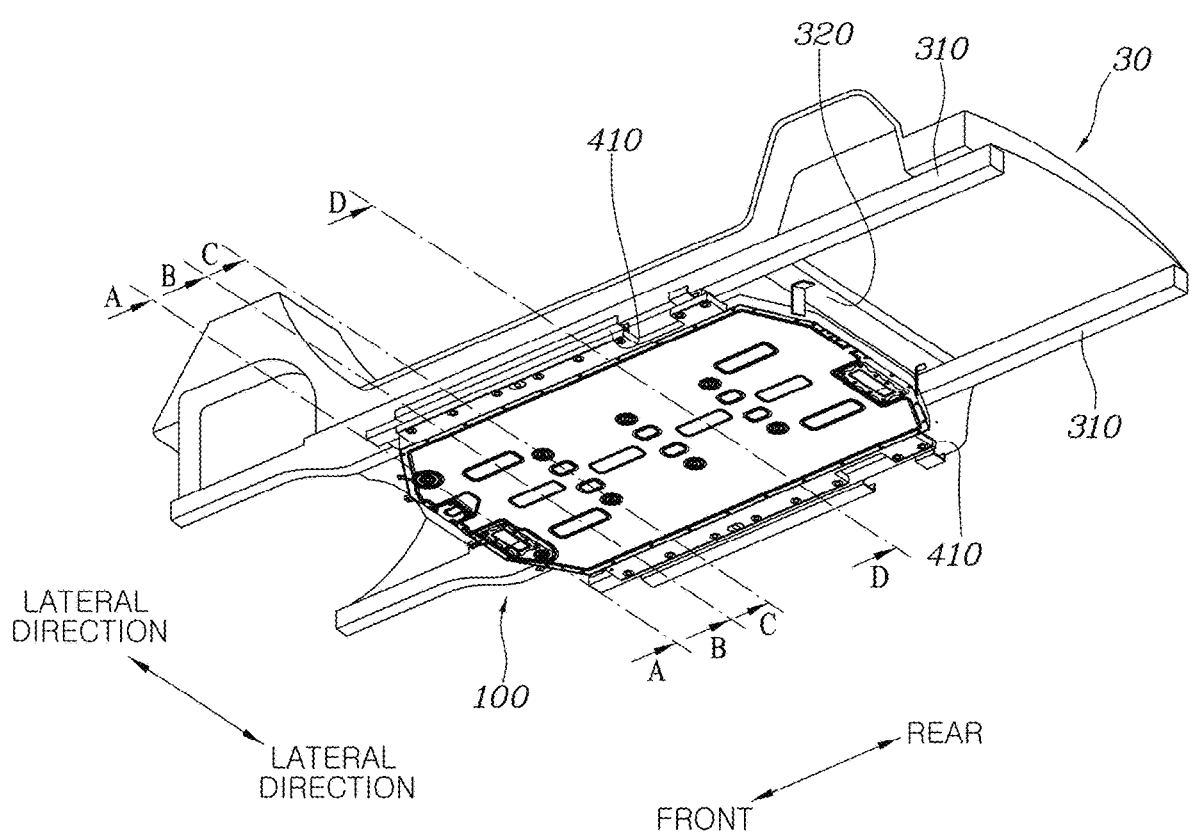
FIG. 5 is a perspective view illustrating a state in which the battery is fastened to the structure illustrated in FIG. 4.

FIG. 4 is a perspective view illustrating a lower portion of a vehicle body to which the structure for fastening a battery according to an embodiment of the present disclosure is applied, and FIG. 5 is a perspective view illustrating a state in which the battery is fastened to the structure illustrated in FIG. 4.

Various embodiments of the present disclosure include a carrier part 400 that serves to separately fasten the battery instead of directly fastening the battery to the vehicle body in order to fasten the battery to the lower portion of the vehicle.

The carrier part 400 may include first members 410 that may be disposed under the vehicle body 30, may extend in the front-rear direction of the vehicle, and may each be disposed at both ends of the lower portion of the first body, and second members 420 that may have both ends bonded to the first member 410 and extend in the lateral direction of the vehicle.

The carrier part 400 may be fixed to the lower portion of the vehicle in the form in which the first member 410 is bonded to the vehicle body. The bonding of the carrier part 400 may be performed using various bonding techniques (for example, welding, etc.) known in the art.

The vehicle body 30 may also include a pair of members 310 that is disposed in the front-rear direction of the vehicle and at least one member 320 that is disposed between the pair of members 310 disposed in the front-rear direction of the vehicle and has both ends connected to the pair of members 310, respectively, for reinforcing rigidity by itself.

Figure 6:
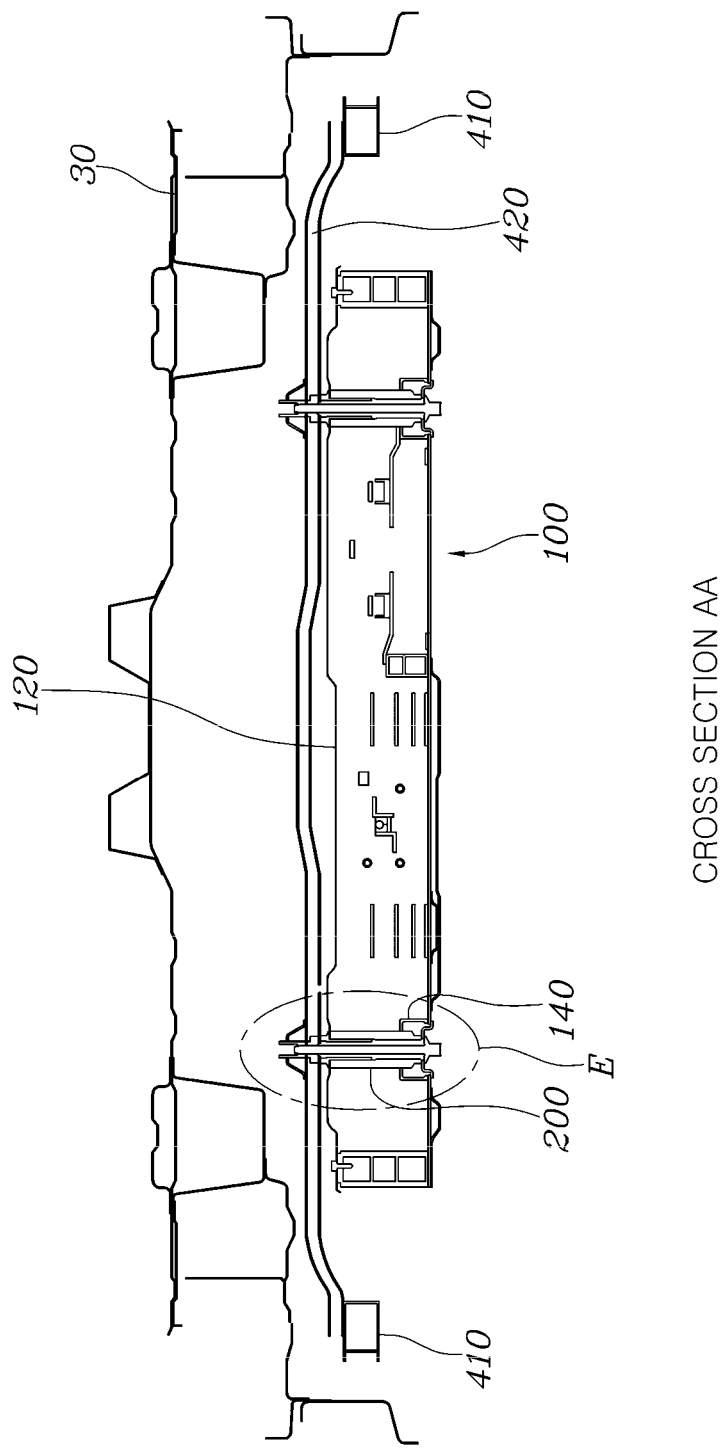
FIG. 6 is a cross-sectional view of the structure for fastening a battery taken along line A-A illustrated in FIG. 5.

FIG. 6 is a cross-sectional view of the structure for fastening a battery taken along line A-A illustrated in FIG. 5.

Referring to FIG. 6, in the structure for fastening a battery according to the embodiment of the present disclosure, the case 100 may be fastened to the second member 420 of the carrier part 400 through fastening members (members corresponding to an area indicated by reference numeral "E"). The cross section illustrated in FIG. 6 is a cross section of the reinforcing member 140 of the battery case 100 illustrated in FIGS. 1 to 3, and the case 100 may be fastened to the second member of the carrier part 400 by the fastening member including the metal bush 200 and the like that is provided in the reinforcing member 140.

Although not described in FIGS. 1 to 3, the battery may further include an additional cover 102 covering the upper portion of the case 100, and the cover 102 may be fixed to the upper portion of the case 100 by the fastening member that fastens between the case 100 and the carrier part 400.

Figure 7:
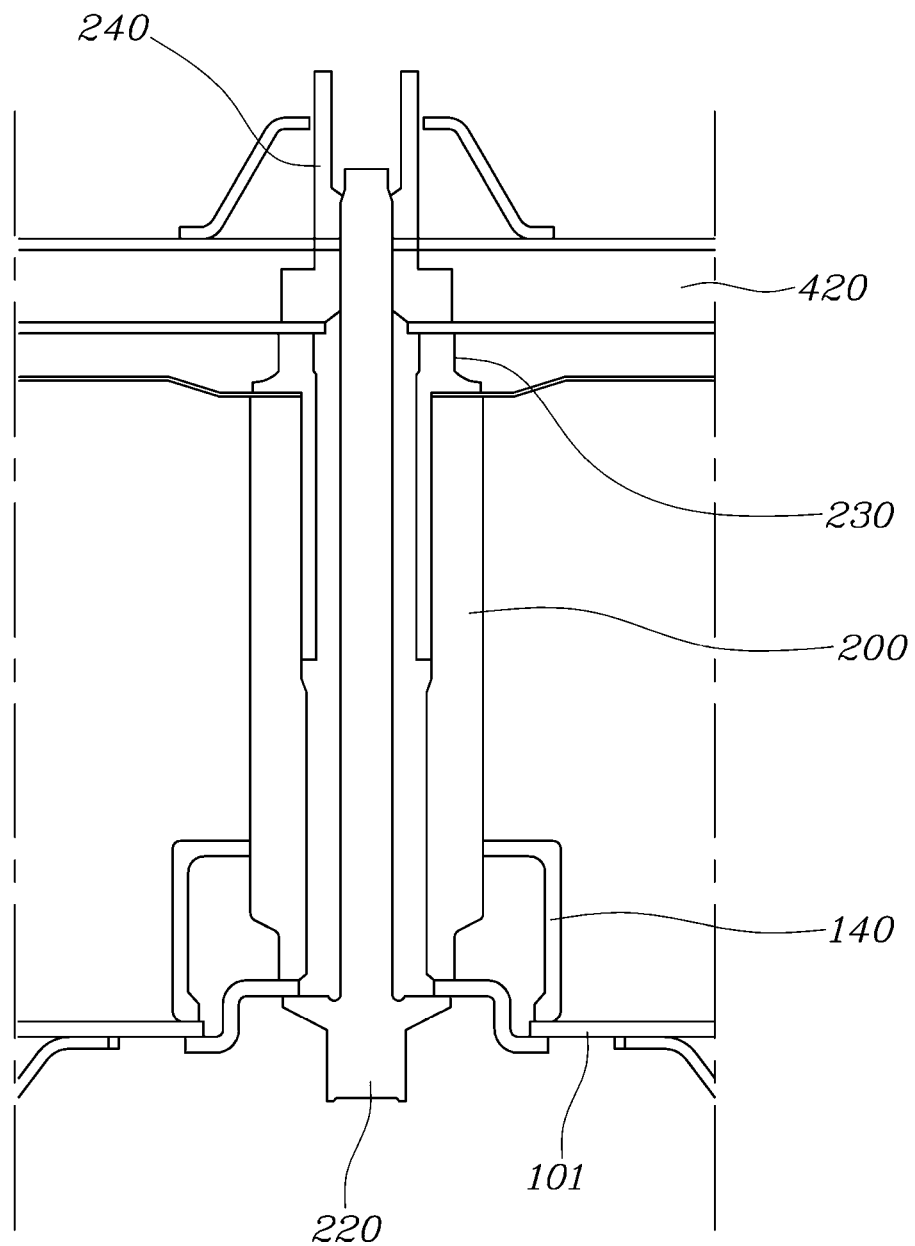
FIG. 7 is a cross-sectional view illustrating in more detail a fastening member corresponding to reference numeral 'E' illustrated in FIG. 6.

FIG. 7 is a cross-sectional view illustrating in more detail a fastening member corresponding to reference numeral 'E' illustrated in FIG. 6.

Referring to FIG. 7, the metal bush 200 may be bonded and fixed to the reinforcing member 140 formed on the lower panel of the battery case 100, and a thread may be formed on an inner circumferential surface of the metal bush 200. In the assembly process, the cover 102 of the battery may be disposed to cover the case 100 before the battery is provided under the vehicle, and the cover 102 may be fixed by fastening a hollow bolt 230 to the metal bush 200.

The fastening hole may be formed in advance at a location where the battery of the second member 420 of the carrier part 400 is fastened, and a pop nut 240 is inserted into the fastening hole from below so that other fastening members may be fixed.

When the battery is aligned for the disposition of the battery, the bolt 220 is inserted into the pre-formed fastening hole under the lower panel 101 of the battery, and the inserted bolt 220 is bonded to the pop nut 240 by penetrating through the hollow of the metal bush 200 and the hollow of the hollow bolt 230 of the metal bush 200, so the battery may be fastened to the vehicle (more precisely, carrier) in part.

The fastening structure illustrated in FIG. 7 may also be applied to fastening the battery and the carrier part through another case inner member (for example, the lateral member 220).

Figure 8:
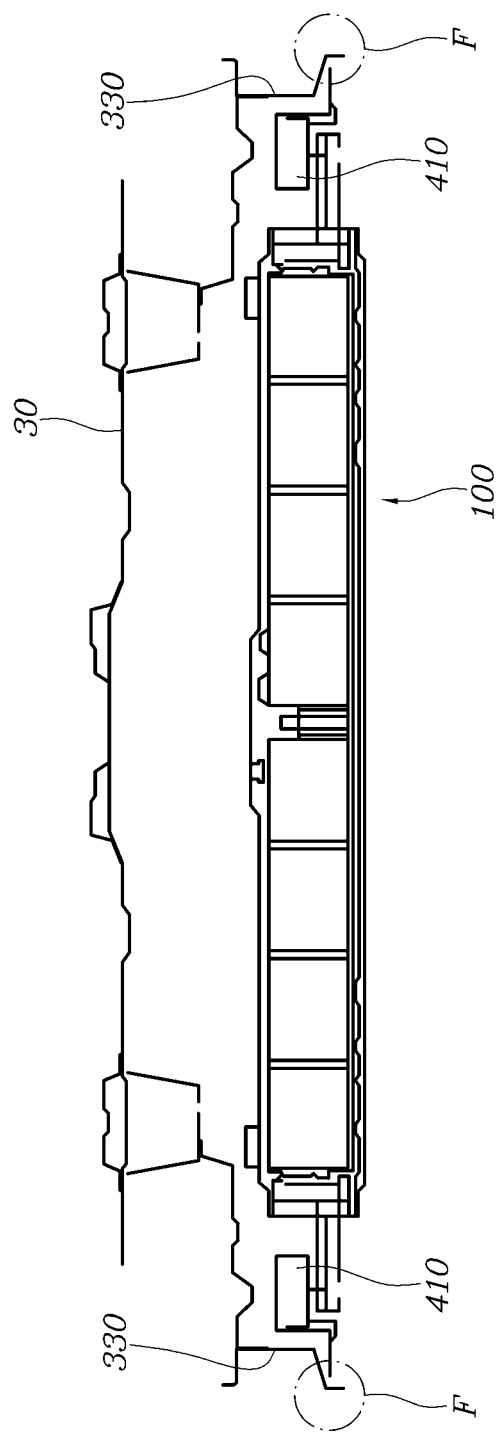
FIG. 8 is a cross-sectional view of the structure for fastening a battery taken along line B-B illustrated in FIG. 5.

FIG. 8 is a cross-sectional view of the structure for fastening a battery taken along line B-B illustrated in FIG. 5.

As illustrated in FIG. 8, an outer side portion of the first member 410 of the carrier part 400 may be bonded to the vehicle body. For example, the outer side portion of the first member 410 of the carrier part 400 may be bonded to a side seal 330 of the vehicle body using a bonding technique known in the art.

Figure 9:
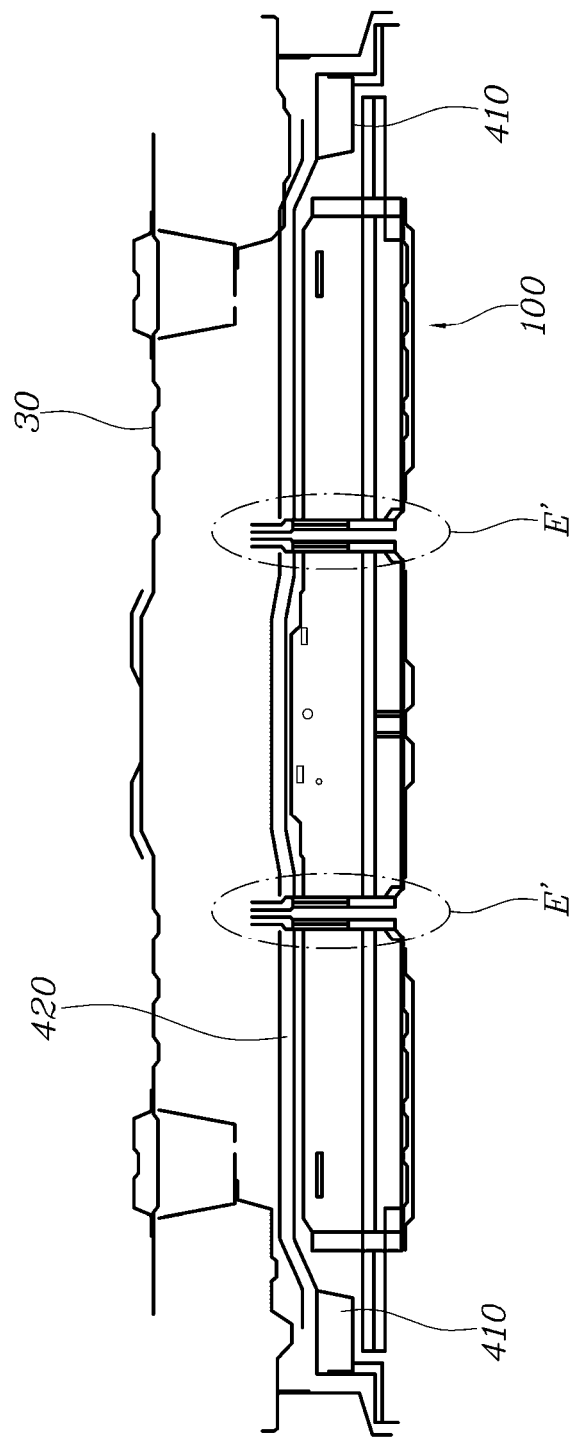
FIG. 9 is a cross-sectional view of the structure for fastening a battery taken along line C-C illustrated in FIG. 5.

FIG. 9 is a cross-sectional view of the structure for fastening a battery taken along line C-C illustrated in FIG. 5.

Referring to FIG. 9, similar to those illustrated in FIG. 6, in the structure for fastening a battery according to the embodiment of the present disclosure, the case 100 may be fastened to the second member 420 of the carrier part 400 by the fastening members (members provided in an area indicated by reference signs E'). The cross section illustrated in FIG. 9 is a cross section of the lateral member 120 of the battery case 100 illustrated in FIGS. 1 to 3, and the case 100 may be fastened to the second member 420 of the carrier part 400 by the fastening member including the metal bush 200 and the like that is provided in the lateral member 120. In addition, as described in FIG. 6, the cover 102 may be fixed to the upper portion by the fastening member that fastens between the case 100 and the carrier part 400.

The fastening member installed in the area indicated by the reference numeral E' may be substantially the same as that illustrated in FIG. 7. That is, the metal bush 200 may be bonded and fixed to the lateral member 120 formed on the lower panel of the battery case 100, and in the assembly process, the cover 102 of the battery may be disposed to cover the case 100 before the battery is provided under the vehicle, and the cover 102 may be fixed by fastening the hollow bolt 230 to the metal bush 200.

The fastening hole may be formed in advance at a location where the battery of the second member 420 of the carrier part 400 is fastened, and the pop nut 240 is inserted into the fastening hole from below so that other fastening members may be fixed. When the battery is aligned for the disposition of the battery, the bolt 220 is inserted into the pre-formed fastening hole under the lower panel 101 of the battery, and the inserted bolt 220 is bonded to the pop nut 240 by penetrating through the hollow of the metal bush 200 and the hollow of the hollow bolt 230 of the metal bush 200, so the battery may be fastened to the second member 420 of the carrier part in part.

Figure 10:
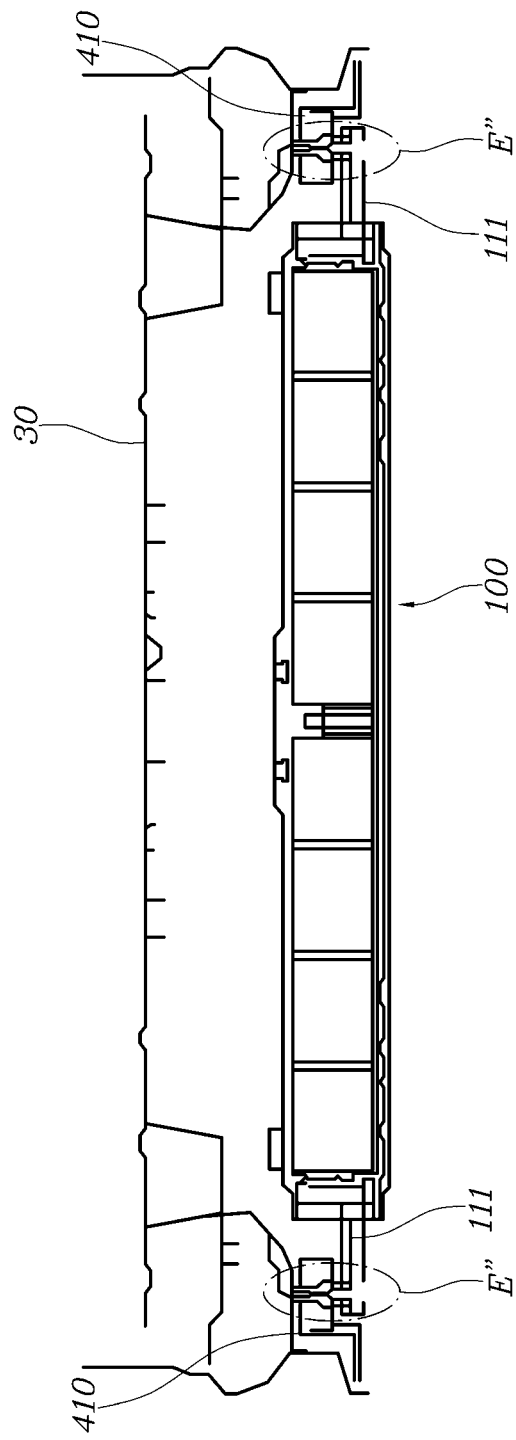
FIG. 10 is a cross-sectional view of the structure for fastening a battery taken along line D-D illustrated in FIG. 5.

FIG. 10 is a cross-sectional view of the structure for fastening a battery taken along line D-D illustrated in FIG. 5.

As illustrated in FIG. 10, the wing part 111 of the battery case 100 may be fastened to the first member 410 of the carrier part 400 by a separate fastening member. In FIG. 10, an area indicated by reference numeral E" is an area in which a fastening member for fastening between the wing part 111 and the first member 410 is disposed, and the fastening may be easily made by applying a fastening member well known in the art, such as the pop nut provided on the first member 410 and a bolt inserted from the lower portion of the wing part 111 and coupled to the pop nut.

Figure 11:
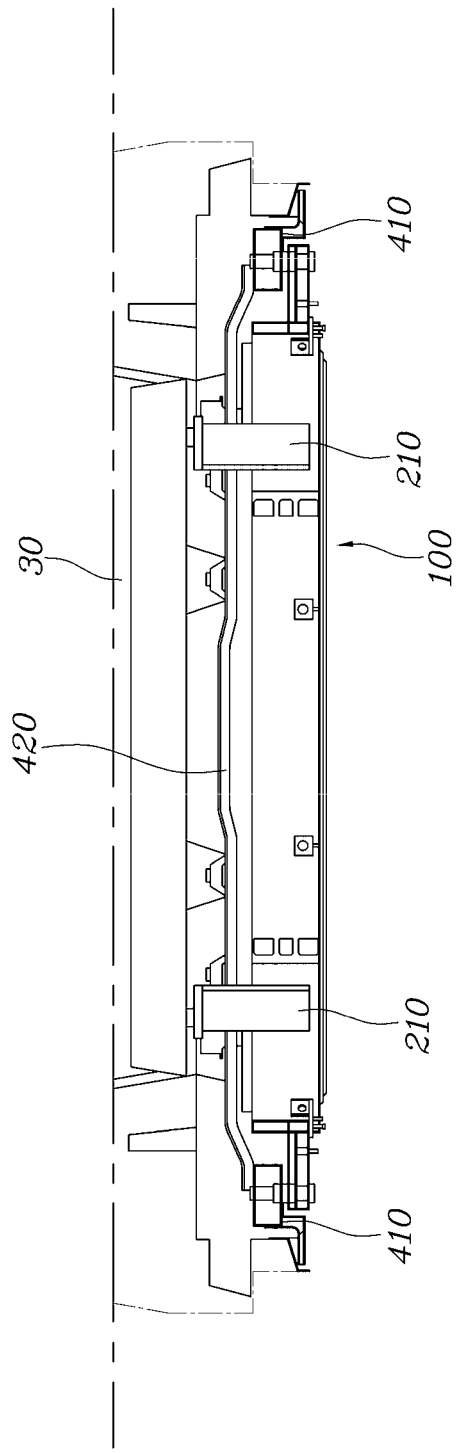
FIG. 11 is a diagram illustrating the structure for fastening a battery illustrated in FIG. 5 viewed from the rear.

FIG. 11 is a diagram illustrating the structure for fastening a battery illustrated in FIG. 5 viewed from the rear.

As illustrated in FIG. 11, the fastening structure according to the embodiment of the present disclosure may form the fastening from the outside of the battery case 100 to the vehicle body in addition to the fastening structure in the form of penetrating through the battery case 100. For example, the battery may further include a fastening member 210 extending upward from the outside of the case 100.

One end of the fastening member 210 may be bonded to the outer surface of the battery case 100, for example, to the outer surface of the side wall member 110. The other end of the fastening member 210 may be fastened to the vehicle body, more specifically, to the member 320 provided in the vehicle body by the known means such as the bolt and the nut.

As described above, according to various embodiments of the present disclosure, the battery may be provided by disposing the carrier between the vehicle body and the battery, so the battery may be easily provided even in a vehicle body that does not have a separate structure required for fastening the battery. In addition, since the battery is fastened to the carrier by the fastening structure penetrating through the battery, the impact is dispersed when the side collision of the vehicle occurs, so the damage to the battery may be minimized.

Although the present disclosure has been illustrated and described with respect to specific exemplary embodiments, it will be obvious to those skilled in the art that the present disclosure may be variously modified and altered without departing from the spirit and scope of the present disclosure as defined by the following claims.

What is claimed is:

1. A structure for fastening a battery to a vehicle, the structure comprising:
   a carrier part including:
      a pair of first members disposed at a lower portion of the vehicle in a longitudinal direction of the vehicle, the pair of first members in contact with sides of a vehicle body, respectively; and
      a plurality of second members each of which having both ends being in contact with the pair of first members; and
   a battery having a case that houses a plurality of battery cells,
   wherein a first portion of the case is connected to the first members, and second portion of the case is connected to the second members,
   wherein the case includes a lower panel, a side wall member disposed along a rim of the lower panel, and a case inner member that is disposed in a space defined by the side wall member, in the longitudinal direction or a lateral direction of the vehicle,
   wherein the case inner member includes:
      a lateral member that extends in the lateral direction of the vehicle; and
      a reinforcing member that connects between the lateral member and the side wall member, and
   wherein the reinforcing member is configured such that the case is fastened to the first members through the reinforcing member.

2. The structure of claim 1,
   wherein the lateral member is configured such that the case is fastened to the first members through the lateral member.

3. The structure of claim 1, wherein the case includes:
   a wing part extending outward in a lateral direction of the case from the side wall member, and
   wherein the wing part is connected to the second members.

4. The structure of claim 1,
   wherein the battery further includes a fastening member extending upward from an outside of the case, and
   wherein the fastening member is configured to fasten the battery and the vehicle body such that a portion of the battery is in a contact with the vehicle body by the fastening member.

5. A structure for fastening a battery to a vehicle, the structure comprising:
   a carrier part including:
      a pair of first members disposed at a lower portion of the vehicle in a longitudinal direction of the vehicle, the pair of first members in contact with both sides of a body of the vehicle, respectively; and
      a plurality of second members having both ends bonded to the pair of first members; and
   a case including a lower panel, a side wall member disposed along a rim of the lower panel, a lateral member that extends in a lateral direction of a vehicle in a space defined by the side wall member, and a wing part that extends outward in a lateral direction of the case from the side wall member,
   wherein the lateral member is connected to the first members and the wing part is connected to the second members, such that the case is configured to be in a contact with the vehicle,
   wherein the case further includes a reinforcing member that connects between the lateral member and the side wall member, and
   wherein the reinforcing member is configured such that the case is fastened to the first members through the reinforcing member.

6. The structure of claim 5, wherein the battery further includes a fastening member extending upward from an outside of the case, and
   wherein the fastening member is configured to fasten the battery and the vehicle body such that a portion of the battery is in a contact with the vehicle body by the fastening member.

7. A structure for fastening a battery to a vehicle, the structure comprising:
   a carrier part including:
      a pair of first members disposed at a lower portion of the vehicle in a longitudinal direction, the pair of first members connected to both sides of a body of the vehicle, respectively; and
      a plurality of second members, each of which having both ends connected to the pair of first members; and
   a case including a lower panel, a side wall member that is formed along a rim of the lower panel, a lateral member that extends in a lateral direction of the vehicle in a space defined by the side wall member, a reinforcing member configured to connect between the lateral member and the side wall member, and a wing part that extends outward in the lateral direction of the case from the side wall member,
   wherein the reinforcing member is connected to the first members and the wing part is connected to the second members such that the case is connected to the vehicle.

8. The structure of claim 7, wherein the lateral member is configured such that the case is fastened to the first members through the lateral member.

9. The structure of claim 7, wherein the battery further includes a fastening member extending upward from an outside of the case, and
   wherein the fastening member is configured to fasten the battery and the vehicle body such that a portion of the battery is in a contact with the vehicle body by the fastening member.

\* \* \* \* \*

UNITED STATES PATENT AND TRADEMARK OFFICE
CERTIFICATE OF CORRECTION

PATENT NO. : 11,850,932 B2
APPLICATION NO. : 17/382805
DATED : December 26, 2023
INVENTOR(S) : Gyung Hoon Shin et al.

Page 1 of 1

It is certified that error appears in the above-identified patent and that said Letters Patent is hereby corrected as shown below:

On the Title Page

Column 1, Item (73), replace the present listing with the following:
-- (73) Hyundai Motor Company, Seoul (KR); Kia Corporation, Seoul (KR) --

Signed and Sealed this
Thirtieth Day of January, 2024

Katherine Kelly Vidal
*Director of the United States Patent and Trademark Office*